US012518867B2

(12) United States Patent
Abbas et al.

(10) Patent No.: US 12,518,867 B2
(45) Date of Patent: Jan. 6, 2026

(54) EFFICIENT DIAGNOSIS OF BEHAVIORAL DISORDERS, DEVELOPMENTAL DELAYS, AND NEUROLOGICAL IMPAIRMENTS

(71) Applicant: Cognoa, Inc., Palo Alto, CA (US)

(72) Inventors: Abdelhalim Abbas, San Jose, CA (US); Jeffrey Ford Garberson, Redwood City, CA (US); Stuart Angus Liu-Mayo, Palo Alto, CA (US)

(73) Assignee: Cognoa, Inc., Palo Alto, CA (US)

( * ) Notice: Subject to any disclaimer, the term of this patent is extended or adjusted under 35 U.S.C. 154(b) by 744 days.

(21) Appl. No.: 17/763,794

(22) PCT Filed: Sep. 30, 2020

(86) PCT No.: PCT/US2020/053611
§ 371 (c)(1),
(2) Date: Mar. 25, 2022

(87) PCT Pub. No.: WO2021/067485
PCT Pub. Date: Apr. 8, 2021

(65) Prior Publication Data
US 2022/0344030 A1 Oct. 27, 2022

Related U.S. Application Data

(60) Provisional application No. 62/908,478, filed on Sep. 30, 2019.

(51) Int. Cl.
*G16H 20/70* (2018.01)
*A61B 5/00* (2006.01)
(Continued)

(52) U.S. Cl.
CPC ............... *G16H 20/70* (2018.01); *A61B 5/16* (2013.01); *A61B 5/7267* (2013.01); *G16H 10/20* (2018.01); *G16H 50/20* (2018.01); *G16H 50/70* (2018.01)

(58) Field of Classification Search
CPC ........ G16H 20/70; G16H 50/70; G16H 50/20; G16H 10/20; A61B 5/16; A61B 5/7267
See application file for complete search history.

(56) References Cited

U.S. PATENT DOCUMENTS 4,860,214 A * 8/1989 Matsuda ................. G06F 18/25
706/53
5,935,060 A * 8/1999 Iliff ........................ G16H 70/60
600/300
(Continued)

FOREIGN PATENT DOCUMENTS

EP 4038633 A1 8/2022
WO WO-2018090009 A1 5/2018
WO WO-2021067485 A1 4/2021

OTHER PUBLICATIONS

Zitnik_Elsevier_2028_pp. 71_91.*
(Continued)

*Primary Examiner* — Michael I Ezewoko
(74) *Attorney, Agent, or Firm* — Wilson Sonsini Goodrich & Rosati

(57) ABSTRACT

Described herein is software used to evaluate individuals such as children for behavioral disorders, developmental delays, and neurological impairments. Specifically, described herein is software configured for use along with methods, devices, systems, and platforms that are used to analyze to aid in the positive or negative diagnosis of individuals for one or more behavioral disorders, developmental delays, and neurological impairments.

19 Claims, 7 Drawing Sheets

(51) Int. Cl.
*A61B 5/16* (2006.01)
*G16H 10/20* (2018.01)
*G16H 50/20* (2018.01)
*G16H 50/70* (2018.01)

(56) References Cited

U.S. PATENT DOCUMENTS

| | | | | |
|---|---|---|---|---|
| 7,052,277 | B2* | 5/2006 | Kellman | G09B 7/00 |
| | | | | 434/323 |
| 7,095,979 | B2* | 8/2006 | Stout | G09B 7/00 |
| | | | | 434/354 |
| 7,155,421 | B1* | 12/2006 | Haldar | G06N 5/01 |
| | | | | 706/46 |
| 7,286,793 | B1* | 10/2007 | Miele | G09B 7/08 |
| | | | | 434/323 |
| 7,289,958 | B2* | 10/2007 | Bernard | G10L 15/063 |
| | | | | 704/255 |
| 7,478,064 | B1* | 1/2009 | Nacht | G06Q 40/00 |
| | | | | 705/38 |
| 8,380,531 | B2* | 2/2013 | Paty | G16H 10/20 |
| | | | | 705/2 |
| 9,269,050 | B2* | 2/2016 | Principe | G06N 3/084 |
| 10,311,645 | B1* | 6/2019 | Ravindran | A61B 5/163 |
| 10,478,112 | B2* | 11/2019 | Wall | A61B 5/168 |
| 10,512,769 | B2* | 12/2019 | Simon | A61N 1/36034 |
| 10,748,644 | B2* | 8/2020 | Shriberg | G09B 19/00 |
| 11,068,649 | B2* | 7/2021 | Zertuche | G09B 7/10 |
| 11,068,650 | B2* | 7/2021 | Zertuche | G09B 7/00 |
| 11,068,651 | B2* | 7/2021 | Zertuche | G09B 7/00 |
| 11,120,895 | B2* | 9/2021 | Shriberg | A61B 5/4803 |
| 11,210,965 | B2* | 12/2021 | Pan | G09B 7/02 |
| 11,275,985 | B2* | 3/2022 | Neumann | G06N 20/20 |
| 11,508,050 | B2* | 11/2022 | Dal Mutto | G06N 5/01 |
| 11,515,136 | B2* | 11/2022 | Richardson | H01J 49/0404 |
| 11,544,582 | B2* | 1/2023 | Suryakantha | G06N 20/00 |
| 11,562,323 | B2* | 1/2023 | Eberhardt, III | G16H 50/50 |
| 11,598,782 | B2* | 3/2023 | Wallach | A61K 31/27 |
| 11,682,474 | B2* | 6/2023 | Weldemariam | G16H 50/70 |
| | | | | 705/2 |
| 11,777,963 | B2* | 10/2023 | Villella | G06N 3/047 |
| | | | | 726/22 |
| 11,848,079 | B2* | 12/2023 | Glasner | G16H 10/20 |
| 11,868,863 | B2* | 1/2024 | Dal Mutto | G06N 3/044 |
| 11,961,624 | B2* | 4/2024 | Smurro | G06N 3/08 |
| 11,972,336 | B2* | 4/2024 | Vaughan | G06N 3/08 |
| 2002/0091563 | A1* | 7/2002 | Wasa | G06Q 30/0203 |
| | | | | 705/7.32 |
| 2005/0075887 | A1* | 4/2005 | Bernard | G10L 15/063 |
| | | | | 704/277 |
| 2005/0176057 | A1* | 8/2005 | Bremer | G01N 33/5082 |
| | | | | 435/6.16 |
| 2005/0197988 | A1* | 9/2005 | Bublitz | G06Q 30/0201 |
| | | | | 706/46 |
| 2005/0260549 | A1* | 11/2005 | Feierstein | G09B 7/02 |
| | | | | 434/236 |
| 2006/0059145 | A1 | 3/2006 | Henschke et al. | |
| 2010/0023346 | A1 | 1/2010 | Paty et al. | |
| 2011/0082712 | A1* | 4/2011 | Eberhardt, III | G16Z 99/00 |
| | | | | 705/4 |
| 2015/0080671 | A1* | 3/2015 | Christensen | A61B 5/4082 |
| | | | | 600/301 |
| 2015/0157235 | A1* | 6/2015 | Jelen | A61B 5/291 |
| | | | | 600/383 |
| 2015/0363554 | A1* | 12/2015 | Farrell | G16H 10/60 |
| | | | | 705/3 |
| 2016/0085921 | A1* | 3/2016 | Farrell | G16H 10/60 |
| | | | | 705/3 |
| 2016/0203280 | A1 | 7/2016 | Neville | |
| 2016/0342756 | A1 | 11/2016 | Wall | |
| 2017/0069216 | A1* | 3/2017 | Vaughan | G16H 50/70 |
| 2017/0091423 | A1* | 3/2017 | Kumar | G16H 20/60 |
| 2017/0160878 | A1* | 6/2017 | Endo | A61B 5/7264 |
| 2017/0262609 | A1* | 9/2017 | Perlroth | G16H 10/60 |
| 2017/0319123 | A1* | 11/2017 | Voss | G06V 10/764 |
| 2019/0043619 | A1 | 2/2019 | Vaughan et al. | |
| 2021/0313077 | A1* | 10/2021 | Smurro | G06N 3/08 |

OTHER PUBLICATIONS

Berlingerio_2019_pp_pp. 410_425.*
Iuculano_Elsevier_2013_pp. 223-230.*
Jones_Behavioural_Brain_Research._Elsevier_2013_pp. 113-124.*
Mehta_2019_Elsevier_pp. 1-124.*
EP20873167.9 Extended European Search Report dated Sep. 26, 2023.
Chinese Patent Application No. 201680082184.8 Office Action dated Feb. 3, 2021.
PCT/US2020/053611 International Preliminary Report on Patentability dated Apr. 5, 2022.
PCT/US2020/053611 International Search Report and Written Opinion dated Dec. 21, 2020.

* cited by examiner

FIG. 3

How bad is it to make a mistake?

| | | we predict | | | |
|---|---|---|---|---|---|
| | | ASD | High Risk | Inconclusive | Neurotypical |
| true class | ASD | 0 | 0.25 | 0.5 | 1 |
| | High Risk | 0.1 | 0 | 0.5 | 0.85 |
| | Neurotypical | 1 | 0.8 | 0.5 | 0 |

1: the worst possible mistake
0: the best possible outcome

EFFICIENT DIAGNOSIS OF BEHAVIORAL DISORDERS, DEVELOPMENTAL DELAYS, AND NEUROLOGICAL IMPAIRMENTS

CROSS-REFERENCE

This application is a National Stage Entry of International Application No. PCT/US2020/053611, filed Sep. 30, 2020, which claims the benefits of provisional patent application Ser. No. 62/908,478, filed Sep. 30, 2019, the disclosure of which is hereby incorporated herein by reference for all purposes.

BACKGROUND OF THE INVENTION

Numerous individuals including children suffer from behavioral disorders, developmental delays, and neurological impairments. Examples of these conditions include attention deficit hyperactivity disorder ("ADHD"), autism (including autism spectrum disorder), and speech disorders.

Healthcare providers typically evaluate behavioral disorders, developmental delays, and neurological impairments using traditional observational techniques such as questionnaires and clinician interviews.

SUMMARY OF THE INVENTION

Described herein are methods, devices, systems, software, and platforms used to evaluate individuals such as children for behavioral disorders, developmental delays, and neurological impairments. Specifically, described herein are methods, devices, systems, software, and platforms that are used to increase the accuracy and efficiency of diagnosing the individual having one or more behavioral disorders, developmental delays, and neurological impairments. As compared to traditional techniques for evaluating individuals for one or more behavioral disorders, developmental delays, and neurological impairments, the methods, devices, systems, software, and platforms described herein evaluate input data specific to the individual and provide a reduced number of inquiries to attain a diagnosis of comparable accuracy. The inventive methods, devices, systems, software, and platforms described herein are designed at least in part to provide treatment to individuals who suffer from mental health conditions including behavioral disorders, developmental delays, and neurological impairments.

Traditionally, questionnaires and clinician interviews are used to diagnose patients suffering from behavioral disorders, developmental delays, and neurological impairments. Clinician interviews are costly in terms of time and resources, and multiple interviews are often required. Questionnaire data can be similarly problematic, as the quality of the data derived depends on the subject's attention span and willingness to participate. As a result, questionnaire data can be incomplete or of poor quality.

Traditionally, behavioral disorders, developmental delays, and neurological impairments are difficult to evaluate and in particular difficult to evaluate accurately and efficiently because of the relatedness of these condition types. That is, each condition type category (i.e. behavioral disorders, developmental delays, and neurological impairments) contain a plurality of condition types, and the condition types are typically related within the same condition type category and across different condition type categories so that the condition types have one or more overlapping symptoms or other identifiers. That is, certain behavioral disorders, developmental delays, and neurological disorders typically have overlapping symptoms making them difficult to distinguish. For example, the behavioral disorder ADHD has overlapping symptoms with developmental disorder of speech delay.

The conditions within each single condition type category (i.e. behavioral disorders, developmental delays, or neurological impairments) tend to be related so that they have one or more overlapping symptoms or other identifiers. For example, a first developmental delay such as autism has overlap with a second developmental delay such as speech delay. As a result, autism can be difficult to differentiate from speech delay using traditional techniques, which may result in an individual receiving an incorrect diagnosis. Similarly, an individual with both developmental delays (i.e. autism and speech delay) may only have one developmental delay diagnosed as opposed to both because the presence of one of the developmental delays may be missed in the presence of the other (i.e. speech delay may be missed in individual with diagnosis of autism and vice versa).

Likewise, the condition types within multiple condition type categories tend to be related so that they have one or more overlapping symptoms or other identifiers. For example, ADHD, a type of behavioral disorder, tends to have overlap with autism, a type of developmental delay. As a result, ADHD can be difficult to differentiate from autism using traditional techniques, which may result in an individual receiving an incorrect diagnosis. Similarly, an individual with both ADHD and autism may only have one diagnosed as opposed to both because the presence of one of the condition types may be missed in the presence of the other (i.e. autism may be missed in individual with diagnosis of ADHD and vice versa).

Traditional techniques for evaluating individuals with at least one condition type selected from the condition type categories of behavioral disorders, developmental delays, and neurological impairments typically involve repeated assessment of individuals often with collection of multiple types of data including various test findings. For example, traditional techniques may involve relatively long question sets that are administered to individuals and/or their caretakers. As such, in addition to being inaccurate due to the relatedness of the condition types assessed (as explained above), traditional techniques are typically time consuming and inefficient.

In addition, traditional approaches tend to be inefficient in a number of ways. For example, traditional instruments for diagnosing behavioral disorders, developmental delays, and neurological impairments involve asking many questions over typically long sessions, whereas many questions asked are often not useful in terms of diagnosis. That is, for illustrative example, in a questionnaire that includes 150 items for some patients only a handful of the items might be diagnostic whereas the other questions are redundant or of only minimal utility given the particular answers given to previous questions in every case.

In contrast to traditional techniques, described herein are methods, devices, systems, software, and platforms for accurately and efficiently assessing individuals for at least one condition type selected from the condition type categories of behavioral disorders, developmental delays, and neurological impairments. More specifically, described herein are methods, devices, systems, software, and platforms to reduce the length of observations, sessions, and/or questionnaires by reducing the number of questions (or other prompts) needed to reach an accurate diagnosis. Also described herein are methods, devices, systems, software, and platforms to increase the accuracy of diagnosing individuals with multiple indications and diagnosing individuals with multiple indications with overlapping symptomology.

Described herein is a computer-implemented method for evaluating an individual, comprising: receiving an input associated with a diagnostic instrument; generating a model of a likelihood of said individual having each of a plurality of conditions; identifying a next input that when received will reduce a measure of uncertainty in said model; and receiving the results of said next input. In some embodiments, said input is a particular question. In some embodiments, said input is a particular questionnaire. In some embodiments, said questionnaire is a shortened version of a full-length questionnaire. In some embodiments, said method comprises determining a classification of said individual as having one of said plurality of conditions. In some embodiments, said classification is based on a sub-set of items from said diagnostic instrument. In some embodiments, said input comprises answers provided by a caretaker of said individual. In some embodiments, said input comprises a video assessment, a video questionnaire, a written questionnaire, an audio recording of a questionnaire, or a non-video questionnaire. In some embodiments, the plurality of conditions include neurotypical and inconclusive. In some embodiments, said model is generated using Monte Carlo methods. In some embodiments, said model is generated using a machine learning model. In some embodiments, said machine learning model comprises a classifier. In some embodiments, said model is generated using at least one question that has been asked to a plurality of individuals with a known positive or negative diagnosis of a behavioral disorder, developmental delay, or neurological impairment. In some embodiments, said model is generated using the answers that have been received from individuals with a known positive or negative diagnosis of a behavioral disorder, developmental delay, or neurological impairment. In some embodiments, said method comprises determining a classification of said individual comprising one of said plurality of conditions. In some embodiments, said method comprises determining whether said classification should be outputted or whether additional inputs are required. In some embodiments, said additional analysis is carried out when an uncertainty of said classification is considered with respect to a cost of carrying out said additional analysis. In some embodiments, said method comprises determining a penalty score for each of said conditions. In some embodiments, a classification of said individual comprising one of said plurality of conditions is outputted only when said penalty score is within a penalty gate. In some embodiments, said method comprises determining a classification of said individual comprising one of said plurality of conditions, and treating said individual based on said classification by providing said individual with a drug therapy. In some embodiments, said method comprises determining a classification of said individual comprising one of said plurality of conditions, and treating said individual based on said classification by providing said individual with a digital therapy. In some embodiments, said plurality of condition comprises two or more of pervasive development disorder (PDD), autism spectrum disorder (ASD), social communication disorder, restricted repetitive behaviors, interests, and activities (RRBs), autism ("classical autism"), Asperger's Syndrome ("high functioning autism), PDD-not otherwise specified (PDD-NOS, "atypical autism"), attention deficit disorder (ADD), attention deficit and hyperactivity disorder (ADHD), speech and language delay, obsessive compulsive disorder (OCD), depression, schizophrenia, Alzheimer's disease, dementia, intellectual disability, or learning disability. In some embodiments, said plurality of conditions comprises autism spectrum disorder.

Described herein is a system for evaluating an individual comprising: a processor; a non-transitory computer readable medium including software configured to cause said processor to: receive an input associated with a diagnostic instrument; generate a model of a likelihood of said individual having each of a plurality of conditions; identify a next input that when received will reduce an uncertainty in said model; and receive said next input. In some embodiments, said input is a response to a questionnaire. In some embodiments, said questionnaire is a shortened version of a full-length questionnaire. In some embodiments, said software can further cause said processor to determine a classification of said individual as having one of said plurality of conditions. In some embodiments, said classification is based on a sub-set of items form said diagnostic instrument. In some embodiments, said input comprises answers provided by a caretaker of said individual. In some embodiments, said input comprises a video assessment, a video questionnaire, a written questionnaire, an audio recording of a questionnaire, or a non-video questionnaire. In some embodiments, the plurality of conditions include neurotypical and inconclusive. In some embodiments, the next requested input is determined using Monte Carlo methods. In some embodiments, said model is generated using a machine learning model. In some embodiments, said machine learning model comprises a classifier. In some embodiments, said model is generated using at least one question that has been asked to a plurality of individuals with a known positive or negative diagnosis of a behavioral disorder, developmental delay, or neurological impairment. In some embodiments, said model is generated using the answers that have been received from individuals with a known positive or negative diagnosis of a behavioral disorder, developmental delay, or neurological impairment. In some embodiments, said software further causes said processor to determine a classification of said individual comprising one of said plurality of conditions. In some embodiments, said software further causes said processor to determine whether said classification should be outputted or whether additional inputs are required. In some embodiments, said additional inputs are required when an uncertainty of said classification is considered with respect to a cost of collected the additional inputs. In some embodiments, said software further causes said processor to determine a penalty score for each of said conditions. In some embodiments, a classification of said individual comprising one of said plurality of conditions is outputted only when said penalty score is less than a penalty gate. In some embodiments, said software further causes said processor to determine a classification of said individual comprising one of said plurality of conditions, and treating said individual based on said classification by providing said individual with a drug therapy. In some embodiments, said software further causes said processor to determine a classification of said individual comprising one of said plurality of conditions, and treating said individual based on said classification by providing said individual with a digital therapy. In some embodiments, said plurality of conditions comprise two or more of pervasive development disorder (PDD), autism spectrum disorder (ASD), social communication disorder, restricted repetitive behaviors, interests, and activities (RRBs), autism ("classical autism"), Asperger's Syndrome ("high functioning autism), PDD-not otherwise specified (PDD-NOS, "atypical autism"), attention deficit disorder (ADD), attention deficit and hyperactivity disorder (ADHD), speech and language delay, obsessive compulsive disorder (OCD), depression, schizophrenia, Alzheimer's disease, dementia, intellectual disability, or learning disability. In some embodiments, said plurality of conditions comprise autism spectrum disorder.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 3 is a schematic representation of an analysis, in matrix form, of a degree of severity in making a mistake in a predication (e.g. due to a relatively high amount of uncertainty).

DETAILED DESCRIPTION OF THE INVENTION

Figure 1:
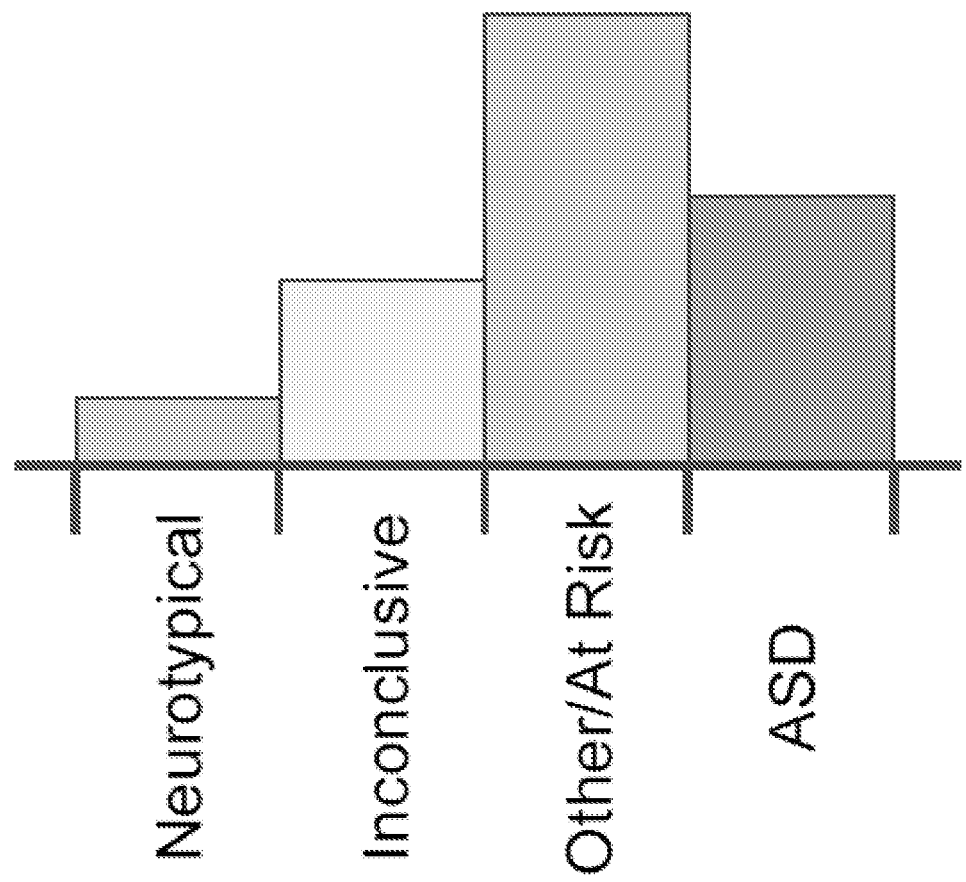
FIG. 1 shows an exemplary histogram of different exemplary classification predictions

Described herein is software used to evaluate individuals including children for behavioral disorders, developmental delays, and neurological impairments. Software described herein is configured in various embodiments to be run on one or more computing devices, within one or more computing system, or on one or more platforms. In some embodiments, input data is analyzed by the software to determine what next input to provide to an individual being assessed in order to most likely reduce the uncertainty of a positive or negative classification for a particular behavioral disorder, developmental delay, or neurological impairment. In some embodiments, a classification assessment is considered against a risk or cost of making an incorrect classification. In some embodiments, the value of additional analysis in terms of reducing uncertainty is considered against the cost of the additional analysis and/or the impact of an error in the classification.

Definitions

As used herein the term "diagnostic instrument" is a tool used to evaluate an individual for a behavioral disorder, developmental delay, and/or a neurological impairment. Non-limiting examples of a diagnostic instrument include a set of questions designed to assess an individual, a set of tasks designed to assess an individual, a video or audio recording of an individual used to assess an individual, or a combination thereof.

As used herein the term "input" or "input data" means data that is either received or could be received by software described herein. Non-limiting examples of input includes questions (or other prompts), responses provided by an individual being assessed, responses provided by a caregiver or healthcare provider of an individual being assessed, audio recordings, video recordings, or a combination thereof. An input may be actually received by software described herein or may be potentially received such as, for example, a response that is sought but not yet provided.

As used herein the term "classification" means an output of software described herein. Non-limiting examples of a classification include a diagnosis, an indication of a likelihood of a diagnosis, a likelihood of a plurality of diagnoses. In general, a diagnosis is a either a condition or a condition type or both.

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

Overview

A diagnostic instrument used to evaluate individuals for behavioral disorders, developmental delays, and neurological impairments are generally configured to elicit a response in an individual being assessed and/or a response of a caregiver of said individual, where that elicited response is intended (together with other responses) to aid in a diagnosis or evaluation of an individual.

A diagnostic instrument may include one or more prompts to elicit responses. Non-limiting examples of prompts include questions that are asked of an individual, their caregiver, and/or their therapist, images or video displayed for the individual, their caregiver, and/or their therapist, as well as audio played for the individual, their caregiver, and/or their therapist. Non-limiting examples of responses includes answers and actions.

Some of the prompts used in traditional modalities are not useful or are of minimal usefulness to certain individuals. In part, because all individuals are different, a prompt designed to elicit a certain response in one individual may be useful to the evaluation of that individual but not at all useful (or minimally useful) in the evaluation of a different individual. As such, there exists a prompt or plurality of prompts for each individual that will elicit a response that will be most useful in evaluating that individual.

The innovative software described herein is configured to identify the most useful prompt for a particular individual being evaluated. Identifying the most useful prompt provides a technique for evaluating individuals with behavioral disorders developmental delays, or neurological impairments that is more speedily carried out than with traditional modalities. The software described herein is able to correctly classify individuals using fewer prompts than necessary in traditional modalities. Because software described herein is able to: (1) identify the most useful next prompt to provide to an individual (or the most useful response to be elicited) and (2) is able to correctly classify individuals using fewer prompts, the innovative software described herein eliminates the need of providing the individual being evaluated with non-useful or minimally useful prompts. This results in a time savings which itself leads to improved accuracy.

Accuracy is improved by, for example, eliminating inaccurate responses, errors, or administrator-bias due to fatigue or loss of attention that results from the traditionally long and time-consuming technique. In some embodiments, a most useful prompt or plurality of prompts is defined as the those that will lead to the most accurate evaluation of an individual. In some embodiments, a most useful prompt or plurality of prompts is defined as those that will lead to the most accurate and efficient evaluation of an individual. In some of these embodiments, efficiency is in terms of time saved in completing the evaluation. In some of these embodiments, efficiency is in terms of cost saved in completing the evaluation.

In some embodiments, an uncertainty of a usefulness of a particular prompt or plurality of prompts is evaluated and those determined to have less uncertainty with respect to their usefulness are selected. In some embodiments, the determination is in real time, and there are prompts immediately provided to the user of the methods, devices, systems, software, and platforms described herein. In some embodiments, the user provides a response to the prompt, and the response is incorporated into the input data. In this way, additional input data is iteratively acquired and processed until a diagnosis is reached efficiently by either reducing time spent or cost or both.

It is beneficial to be able to take a subset of total prompts available in a diagnostic instrument and determine in real-time if responses to the subset of total prompts are sufficient to classify an individual as having a particular condition type based on the responses available (i.e. less than the complete amount of responses). That is, it is beneficial to have software as described herein that is configured to determine whether an individual can be classified accurately and efficiently based on incomplete input data to the software. In some of these embodiments, efficiency is in terms of time saved in completing the evaluation. In some of these embodiments, efficiency is in terms of cost saved in completing the evaluation.

Input Data

In some embodiments, software as described herein receives input data corresponding to features associated with evaluating an individual for a behavioral disorder, developmental delay, or neurological impairment. A feature, in some embodiments, comprises a response provided by an individual being evaluated, their caregiver, or their therapist. In some embodiments, a feature comprises an observation of an individual being evaluated such as, for example, an observation of a video or audio recording of said individual.

In some embodiments, the input data comprises questions asked to the individual, questions asked about the individual to a caretaker of the individual, questions asked about the individual to a clinician of the individual. In some embodiments, the responses to some questions are absent or have inappropriate entries. In some embodiments, the input data is incomplete, for example, it contains questions which were not answered or otherwise does not include answers to a complete instrument (e.g. because they were not asked of the individual).

In some embodiments, the input data is provided by a caretaker of the individual. In some embodiments, the input data is provided by a clinician evaluating the individual. In some embodiments, the input data is provided by the individual.

In some embodiments, the input data is received by a digital computing device or transferred to a digital computing device.

In some embodiments, the input data comprises a video assessment, a video questionnaire, a written questionnaire, an audio recording of a questionnaire, or a non-video questionnaire.

Analytic Software Modules

In some embodiments, software described herein comprises an advisory module and a dynamic module. In some embodiments, software described herein includes an advisory module only. In some embodiments, software as described herein includes a dynamic module only.

An advisory module is generally configured to determine a best next prompt to provide to an individual being assessed and provide an accurate and efficient classification based on incomplete input.

Typically, the advisory module makes this determination without having all of the information with respect to the individual being evaluated available to it. For example, an advisory module, in some embodiments, determines a best next prompt to provide to an individual based on only a few responses from the individual. For example, an advisory module provides a classification of an individual based on incomplete input.

A dynamic module is generally configured to apply the advisory module in an efficient manner so that, for example, individuals with greatest uncertainty as to their evaluation and/or that will be most severely impacted by an incorrect classification result will be directed to additional evaluation whereas those who are evaluated with little to no uncertainty and/or risk are not further evaluated. In some embodiments, a dynamic module also carries out a cost analysis with respect to reducing the uncertainty of an analysis result as well, which is weighed against the benefit of doing so.

In some embodiments, a software module as described herein includes only an advisory module. In some embodiments, a software module as described herein includes only a dynamic module. In some embodiments, a software module as described herein includes both an advisory module and a dynamic module.

Advisory Module

An advisory module as described herein generally provides predictions based on incomplete input data (i.e. missing inputs). A prediction, in some embodiments, comprises a most useful input to be obtained from an individual. A prediction, in some embodiments, comprises a determination of a classification that best fits the individual.

In some embodiments, a degree of uncertainty with respect to an evaluation of an individual due to incompleteness of input data, is weighed by the advisory module against the clinically-driven asymmetric nature of different types of classification errors. In some embodiments, the advisory module is configured to make case-by-case decisions on when available data results in acceptable prediction uncertainty (as weighted against the clinically-driven risk assessment of different types of classification errors), and consequently, provide for an overall efficient predictive system.

In some embodiments, the advisory module is configured to output a classification for an individual, where a classification is the identification of an individual as likely having one or more condition types. Condition types may include, for example autism, autism spectrum disorder, ADHD, and neurotypical. For example, an individual may be classified as having autism spectrum disorder, ADHD, or being neurotypical or, for example, an individual may be classified as having both autism and ADHD. In some embodiments, classification also includes identifying individuals at risk of developing a particular condition type. In some embodiments, classification also includes identifying individuals whose classification is indeterminate.

The clinically driven asymmetric nature of different classification errors arises in part at least due to the flaws in the traditional diagnostic modalities. There are currently no laboratory or radiographic tests that identify behavioral disorders, developmental delays, or neurological impairments. Rather, traditional diagnostic modalities tend to be subjective and can be biased due to various errors. In addition, behavioral disorders, developmental delays, or neurological impairments typically have significant overlap in terms of symptomatology, meaning that accurate diagnosis is difficult and errors are common. As such, with behavioral disorders, developmental delays, and neurological impairments there is typically a degree of clinical classification error. As such, it is fairly typical for individuals to be misclassified, and, in some embodiments, a degree of accuracy of classification that the advisory module is configured to achieve is considered within that context. For example, if traditional modalities typically achieve an accuracy of 90% for classifying individuals as having a particular behavior disorder, the advisory module, in some embodiments, is configured to output a classification of that particular behavior disorder when it predicts that it has achieved an accuracy of 90% or better.

The advisory module is generally configured to: (1) provide predictions with respect to classification of individuals including situations where the data available to make the determinations is incomplete, (2) quantify the specific uncertainty in the prediction of classification made, and (3) compare the acceptability of that uncertainty within the context of traditional clinical uncertainty and/or error.

FIG. 1 shows an exemplary histogram of different exemplary classification predictions. Here, in FIG. 1, the exemplary classifications available to the advisory module are neurotypical, inconclusive, at risk for/having another disorder (besides Autism Spectrum Disorder), and Autism Spectrum Disorder positive. It should be understood that the four classification types shown are exemplary only and other embodiments of the software described herein may generate different classification types, more classification types, or fewer classification types.

As explained, the advisory module is configured to determine a classification likelihood for an individual, referred to herein as a classification value. As shown in FIG. 1, in this example, the advisory module predicts, based on the data that was inputted to it, that an individual is most likely classified as at risk for/or having another disorder besides Autism Spectrum Disorder.

Input data used by the advisory module is typically in the form of a response to prompt as described herein. In addition, as described, the advisory module is configured to provide a classification prediction (like the one shown in the exemplary schematic of FIG. 1) using an incomplete input. Non-limiting examples of incomplete data includes responses given to a sub-set of prompts from a diagnostic instrument (as opposed to the entire set of responses).

Typically, data models are configured to produce a single classification (e.g. yes or no), but in contrast the advisory module described herein is configured to determine a classification value for multiple different classification types as shown in FIG. 1 (i.e. neurotypical, inconclusive, at risk for/having another disorder (besides Autism Spectrum Disorder), and Autism Spectrum Disorder).

In some embodiments, the advisory module uses a Monte Carlo method to make classification predictions. A Monte Carlo method models the uncertainty in one or more inputs using repeated random sampling to make numerical estimations of unknown parameters so that a most likely classification can be made. More specifically, Monte Carlo modeling applied to the incomplete data provided to the advisory module is used to estimate the uncertainty associated with one or more inputs and model what input will reduce the overall uncertainty given the data available to the advisory module. Said in another way, the Monte Carlo model is utilized to predict what classification of the individual is most likely made were it that all of the data available was provided as an input. In some embodiments, any other statistical technique that is appropriate to quantify uncertainty empirically or formulaically can be used in lieu of Monte Carlo.

In some embodiments, the advisory module makes a prediction using insufficient input by utilizing machine learning and machine learning based modeling. In some embodiments, machine learning is used in conjunction with a Monte Carlo method. In some embodiments, machine learning is used to generate models based on population data comprising respective responses to the diagnostic instrument and classifications of individuals within the population. In some embodiments, a machine learning model is used to generate a classifier. Data used to generate a machine learning model, in some embodiments, include one or more questions that have been asked to a plurality of individuals with a known positive or negative diagnosis of a behavioral disorder, developmental delay, or neurological impairment. A type of response or responses that may be used to construct a model may comprise the most common answer to a plurality of individuals with a known positive or negative diagnosis of a behavioral disorder, developmental delay, or neurological impairment.

It should be understood that different types of values are suitable for use with respect to quantifying a classification value within multiple classification categories as shown in FIG. 1. A classification value attributed to a particular classification type may represent, for example, a likelihood of an individual being classified within that respective category or, for example, a degree of uncertainty associated with an individual being classified within that respective classification category. In general, having a relatively high likelihood of being classified into multiple classification categories is deemed more uncertain than having a relatively high likelihood of being classified into two or fewer classification categories. As an illustrative example, if individual A has an 80% certainty of classification ASD, 15% certainty of classification ADHD, and 5% certainty of classification Neurotypical, while individual B has a 45% certainty of classification ASD, 35% certainty of classification ADHD, and 20% certainty of classification Neurotypical, then it may be determined that there is more overall certainty for individual A's condition than for individual B's condition.

In some embodiments, the advisory module considers all non-provided prompts (e.g. all unasked questions) from a set of prompts and simulates the many possible responses to the remaining non-provided prompts. The advisory module then generates a "spread," which is represented schematically by the histogram of FIG. 1 where a height of each column represents an estimate of the value of obtaining each possible response. In some embodiments, model threshold values are further used to divide the "spread" into specific classification types (i.e. divide the data into different types of buckets).

Figure 2:
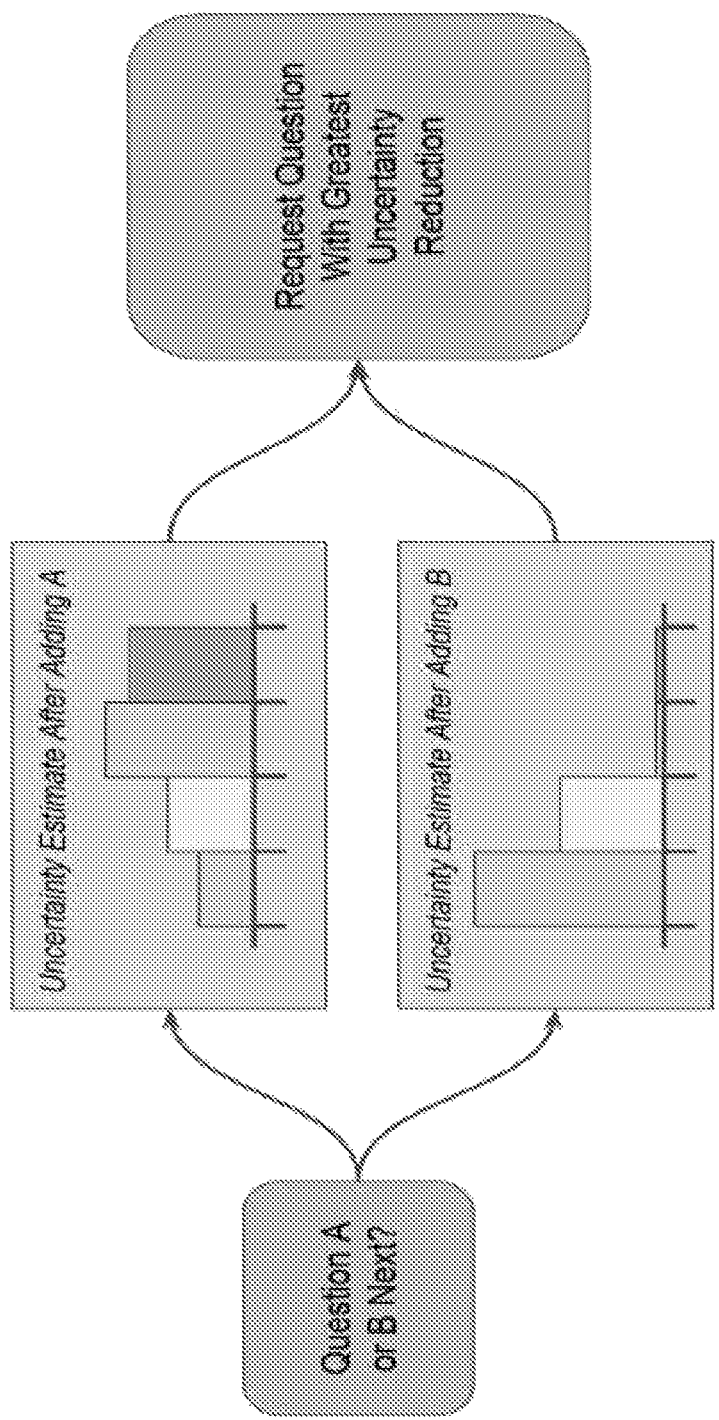
FIG. 2 shows an exemplary schematic of how the advisory module is utilized in real time to determine what a next most predictive (or optimal) input to obtain given the degree of uncertainty of a particular classification.

FIG. 2 shows an exemplary schematic of how the advisory module is utilized in real time to determine what a next most predictive (or optimal) input to obtain given the degree of uncertainty of a particular classification. In these embodiments, the advisory module considers what prompt (in this example a question) will provide the most significant reduction in the uncertainty of the classification. As shown, in FIG. 2, adding a response from question A as input to the advisory module leads to a classification histogram where three classification values for a particular condition are spread across four different classification types, whereas a response from question B, reduces the uncertainly overall by essentially eliminating the classification values of two of the classification types (i.e. so now only two classification types are considered likely). It should be understood that uncertainty may be lowered in numerous ways. In this embodiment, the advisory module is configured to be used in real-time to suggest that question B (i.e. the question predicted to decrease overall uncertainty) be provided to the individual being evaluated. It should be understood that in general the advisory module is not limited to analysis of questions only. Any input that can be provided to the advisory module can be analyzed in the same manner to determine what next input will decrease the uncertainty of the classification prediction. In addition, in certain embodiments, the advisory module provides a suggestion of getting an input from a person who is not the individual being evaluated as that will provide the greatest decrease in the uncertainty of the classification prediction. For example, the advisory module may suggest that the next input be provided by a caregiver or a therapist of the individual being evaluated. In general, a particular input may be also be suggested in response to different types of changes in uncertainty that are determined by the advisory module.

In some embodiments, obtaining a particular input as the next input is suggested when, a classification value changes in one or more classification types. That is, given multiple classification types, each classification category is assigned a value for an individual being assessed with respect to each input received by the advisory module. In some embodiments, obtaining a particular input as the next input is suggested when, a classification value of an indeterminate classification category decreases. In some embodiments, obtaining a particular input as the next input is suggested when, a classification value of the neurotypical classification category or the atypical classification category increases and the classification value of the inconclusive classification category decreases. In some embodiments, obtaining a particular input as the next input is suggested when, a classification value of a neurotypical classification category and the atypical classification category increases and the classification value of the inconclusive classification category decreases. In some embodiments, obtaining a particular input as the next input is suggested when, a classification value of a neurotypical classification category or an atypical classification category is maximized and the classification value of an inconclusive classification category is minimized. In some embodiments, obtaining a particular input as the next input is suggested when, a classification value of the typical classification category and the atypical classification category are maximized and the classification value of the inconclusive classification category is minimized. In some embodiments, obtaining a particular input as the next input is suggested when, a threshold value is applied to one or more classification types and the classification values surpass the threshold value.

In some embodiments a model response value is determined that is correlated to the classification outcome and a measure of the variance of this response based on possible unknown input values is estimated, and the next input is suggested when it will reduce this variance by the greatest amount. In some embodiments one or more of these techniques is evaluated for multiple conditions that are being predicted and an aggregate value across conditions is calculated to suggest the next input.

An advisory module is configured to determine a degree of acceptable uncertainty given the uncertainty in typical clinical diagnosis. In some embodiments, a risk analysis is carried out as represented in the schematic of FIG. 3.

FIG. 3 is a schematic representation of an analysis, in matrix form, of a degree of severity in making a mistake in a predication (e.g. due to a relatively high amount of uncertainty). In general, a false negative diagnosis where an individual with autism spectrum disorder is mistakenly classified as a neurotypical individual is considered as worse than mistakenly classifying an individual with autism spectrum disorder as either high risk for a disorder (such as autism spectrum disorder) or as being inconclusive. The schematic matrix shows the values attributed by the advisory module to certain types of errors. For example, if an individual whose true condition is positive for ASD is classified by the algorithm as being High Risk, then the penalty for that classification according to the matrix in FIG. 3 would be 0.5, but if the same individual was instead classified by the algorithm as being Neurotypical, then the penalty of that classification would be higher at 1.0.

The values attributed to a particular error can also be referred to as a penalty score. In some embodiments, a penalty score is expressed as a float between 0 and 1, inclusive. More specifically, in some embodiments, a penalty score is a float that measures the expected badness/risk is of issuing a particular classification, computed by interpreting the spread through the penalty matrix. In some embodiments, a penalty gate is a float value that represents the largest penalty score that is acceptable. In general, if a penalty score of a particular classification prediction is less than the penalty gate associated with that classification, then that classification will be issued. In some embodiments, the values of penalty gates are preset by examining the effect of different choices on the overall performance on held-out validation data.

Figure 4:
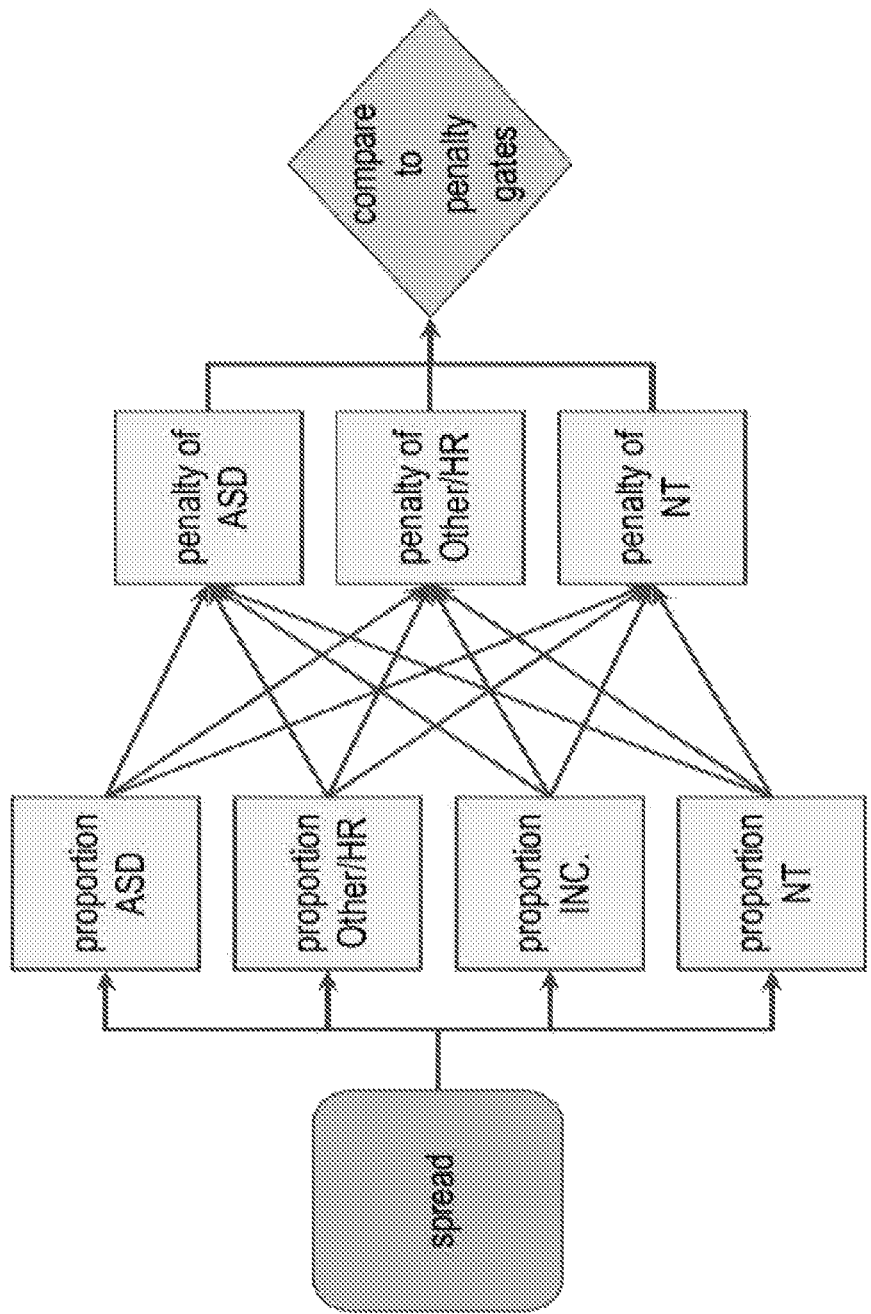
FIG. 4 shows a schematic representation of an exemplary algorithm carried out by the advisory module for deciding if a classification can be outputted by the software.

FIG. 4 shows a schematic representation of an exemplary algorithm carried out by the advisory module for deciding if a classification can be outputted by the software. FIG. 4 shows that, as described, in an initial step, a spread is determined. In the example of FIG. 4, as above, the advisory module determines a classification value for an individual based on one or more inputs within the classification types of autism spectrum disorder, inconclusive, neurotypical, and at risk (which are generated by applying threshold values to the spread). In some embodiments, various inputs are suggested as being the next best input based on their expected effect on uncertainty, as described above.

Next, a penalty score is determined for each classification with respect to the three other respective classification types. For example, if there is a certain true classification value for a classification of autism spectrum disorder, a penalty score is determined with respect to an error where the predicted classification is inconclusive, an error where the predicted classification is neurotypical, and an error where the predicted classification is at risk. The penalty scores are then compared to the penalty gate. In this example, when the classification value is high and the penalty scores are less than the limits of the penalty, the classification of autism spectrum disorder is given. That is, for each classification value, the classification value is considered against the penalty scores with respect to errors and the penalty gates.

In this embodiment, achieving a high classification value with relatively low (as defined) risk associated with an error results in a particular classification being outputted. This results in an efficient classification while taking into account the risk of a mistaken classification being delivered.

Figure 5:
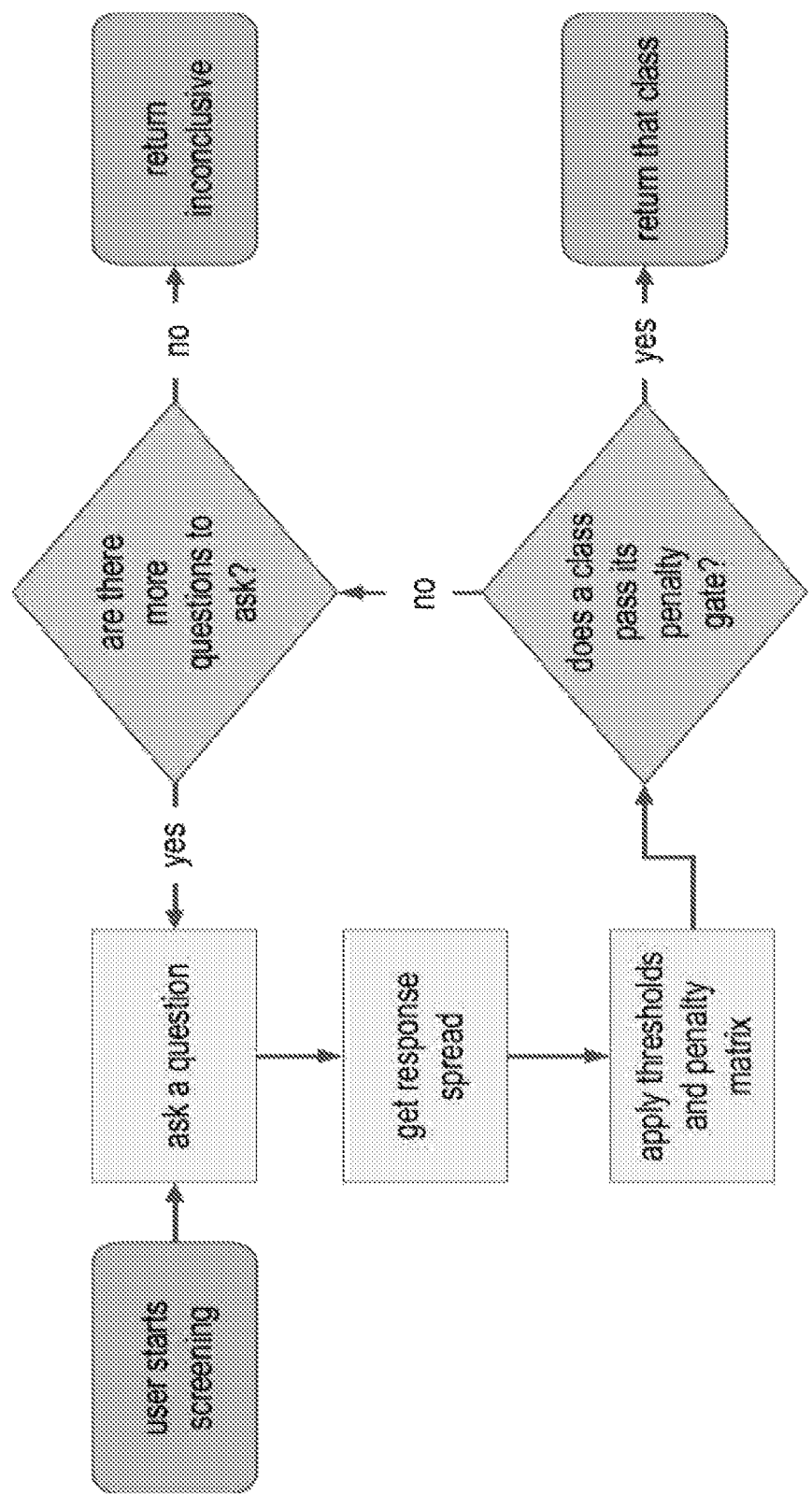
FIG. 5 shows another schematic example of an algorithm as carried out by the advisory module. In an initial step, a user is screened by being asked a question.

FIG. 5 shows another schematic example of an algorithm as carried out by the advisory module. In an initial step, a user is screened by being asked a question. In a next step, a spread is established based on a simulation of the many possible ways the remaining questions might be answered. In a next step, thresholds are applied along the spread to create a number of classification types (e.g. autism spectrum disorder, ADHD, neurotypical, etc.). In a next step, penalty scores are applied as described above and compared to the penalty gates. If at that point, the penalty scores are less than the penalty gate, the classification is outputted (as in FIG. 4). If the penalty scores are not less than the penalty gate, the advisory module then determines if there are additional questions that should be asked and if not, then an inconclusive classification is outputted.

In some embodiments, more than a single classification has a penalty score that is less than a penalty gate. For example, one or more classification types determined by the thresholds have penalty scores above a penalty gate and one or more classification types do not have penalty scores above a penalty gate. In some of these embodiments, in order to determine which classification to output, the advisory module makes additional determinations. An additional determination made by an advisory module in order to determine a classification to output when more than a single classification has a penalty score that is less than a penalty gate may include a determination of how close the penalty scores for each classification. An additional determination made by an advisory module in order to determine a classification to output when more than a single classification has a penalty score that is less than a penalty gate may include a determination of a next question to present to an individual being assessed, wherein the question is determined to decrease the uncertainty of one or more classifications. An additional determination made by an advisory module in order to determine a classification to output when more than a single classification has a penalty score that is less than a penalty gate may include a determination of a cost analysis of obtaining a particular input from an individual being assessed (or for providing a particular prompt to said individual) compared to the degree of the effect said input is expected to have on said uncertainty. For example, if obtaining a particular input would have a high cost (as measured in terms of monetary cost and/or efficiency cost) and would be expected to only affect uncertainty slightly, such an input, in some embodiments, would not be sought out by the advisory module.

Dynamic Module

Figure 6:
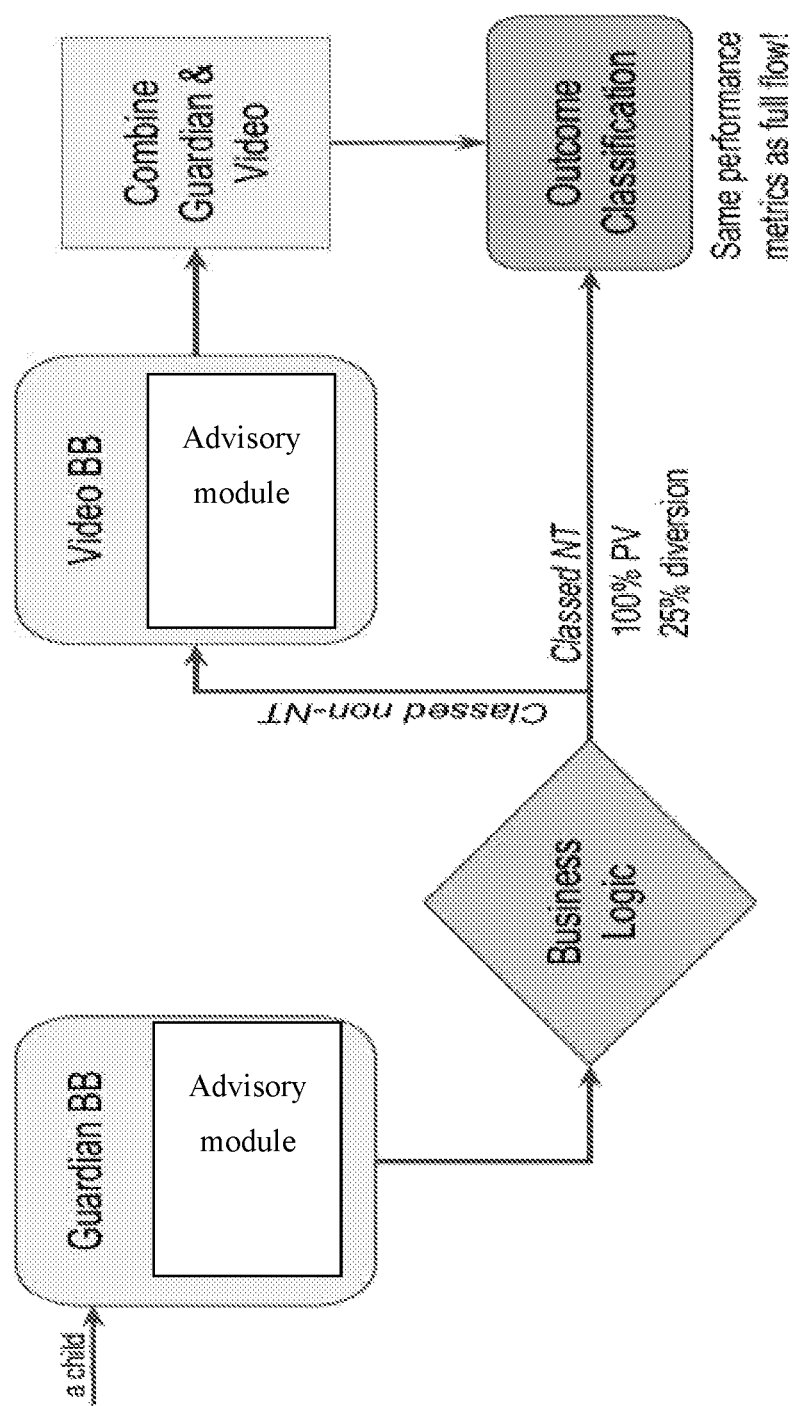
FIG. 6 shows a schematic example of a dynamic module which incorporates business logic with the application of the advisory module.

FIG. 6 shows a schematic example of a dynamic module which incorporates business logic with the application of the advisory module. In some embodiments, software as described herein includes a dynamic module which selectively applies an advisory module, as described herein. In a first step, a dynamic module applies an advisory module to a diagnostic instrument comprising questions. The output of the advisory module is then analyzed by the dynamic module with respect to the cost of improving the accuracy of the output. When a classification is outputted as non-neurotypical and the cost analysis indicates that further analysis is warranted, a new diagnostic instrument is applied, which in this example is a video recording of the individual being evaluated where the video recording is provided as an input to the advisory module. The output of the video recording analysis is combined with the initial output and a classification is determined based on that result. If on the other hand, the result of the initial advisory module classification was of neurotypical and the cost analysis indicated that further testing would not be cost effective given uncertainty of the classification and the cost of performing additional analysis, a classification of neurotypical would be outputted.

In some embodiment, a dynamic module is configured to carry out an analysis shown in the schematic representation of FIG. 3 or otherwise receive that analysis as an input. For example, a penalty score is determined and based on the penalty score determined, a dynamic module determines whether obtaining additional input through, for example, additional assessment of an individual is warranted.

In some embodiments, a penalty score associated with a classification is at least one metric used to evaluate whether a certain amount of uncertainty is acceptable. For example, a very low level of uncertainty for a classification having a relatively high penalty score may be deemed to be unacceptable and require further analysis of the individual (via, e.g., additional testing). Whereas, the same or similar uncertainty as the previous example may be deemed acceptable when the penalty score is relatively low and the classification associated with the uncertainty is outputted.

Methods for Evaluating Behavioral Disorders, Developmental Delays, and Neurological Impairments In some embodiments, an individual is evaluated by a series of prompts in the form of questions displayed on a screen of a computing device.

In some embodiments, an individual is evaluated by recording video and/or audio data of the individual interacting with other people, carrying out tasks, and/or answering questions. In some embodiments, the individual is recorded answering questions asked by a human questioner or caretaker.

In some embodiments, a questionnaire is completed by the subject, caretaker, or clinician on a mobile device or stationary computing device. In some embodiments, a video and/or audio recording is taken with a mobile device. In some embodiments, the mobile device is a smartphone, a tablet, a smartwatch, or any device with a mobile camera or recording feature. In some embodiments, the video and/or audio recording is taken with a stationary camera and/or microphone. For example, an individual may be asked questions in a clinician's office and have their responses recorded with a camera on a tripod with a mounted microphone.

The software described herein, in some embodiments, is located on a computing device used to receive the input to the software. In some embodiments, software as described herein is located on a server that is communicatively coupled with a computing device used by the individual being evaluated.

In some embodiments, the methods disclosed herein are used to aid in the diagnosis behavioral disorders, developmental delays, or neurological impairments.

Non-limiting examples of conditions classified as behavioral disorders comprise Attention Deficit Hyperactivity Disorder (ADHD), Oppositional Defiant Disorder (ODD), Autism Spectrum Disorder (ASD), Anxiety Disorders, Depression, Bipolar Disorders, Learning Disorders or Disabilities, or Conduct Disorder. In some embodiments, an Attention Deficit Hyperactivity Disorder comprises Predominantly Inattentive ADHD, Predominantly Hyperactive-impulsive type ADHD, or Combined Hyperactive-impulsive and Inattentive type ADHD. In some embodiments, Autism Spectrum Disorder comprises Autistic Disorder (classic autism), Asperger Syndrome, Pervasive Developmental Disorder (atypical autism), or Childhood disintegrative disorder. In some embodiments, Anxiety Disorders comprise Panic Disorder, Phobia, Social Anxiety Disorder, Obsessive-Compulsive Disorder, Separation Anxiety Disorder, Illness Anxiety Disorder (Hypochondria), or Post-Traumatic Stress Disorder. In some embodiments, Depression comprises Major Depression, Persistent Depressive Disorder, Bipolar Disorder, Seasonal Affective Disorder, Psychotic Depression, Peripartum (Postpartum) Depression, Premenstrual Dysphoric Disorder, 'Situational' Depression, or Atypical Depression. In some embodiments, Bipolar Disorders comprise Bipolar I Disorder, Bipolar II Disorder, Cyclothymic Disorder or Bipolar Disorder due to another medical or substance abuse disorder. In some embodiments, learning disorders comprise Dyslexia, Dyscalculia, Dysgraphia, Dyspraxia (Sensory Integration Disorder), Dysphasia/Aphasia, Auditory Processing Disorder, or Visual Processing Disorder. In some embodiments, behavioral disorder is a disorder defined in any edition of the Diagnostic and Statistical Manual of Mental Disorders (DSM).

Non-limiting examples of conditions classified as developmental delays comprise Autism Spectrum Disorder, Mental Retardation, Cerebral Palsy, Down Syndrome, Failure to Thrive, Muscular Dystrophy, Hydrocephalus, Developmental Coordination Disorder, Cystic Fibrosis, Fetal Alcohol Syndrome, Homocystinuria, Tuberous Sclerosis, Abetalipoproteinemia, Phenylketonuria, Aase Syndrome, speech delays, gross motor delays, fine motor delays, social delays, emotional delays, behavioral delays, or cognitive delays. In some embodiments, Mental Retardation comprises Adrenoleukodystrophy, Ito Syndrome, Acrodysostosis, Huntington's Disease, Aarskog Syndrome, Aicardi Syndrome or Tay-Sachs Disease. In some embodiments, Cerebral Palsy comprises Spastic Cerebral Palsy, Dyskinetic Cerebral Palsy, Hypotonic Cerebral Palsy, Ataxic Cerebral Palsy, or Mixed Cerebral Palsy. In some embodiments, Autism Spectrum Disorder comprises Autistic Disorder (classic autism), Asperger Syndrome, Pervasive Developmental Disorder (atypical autism), or Childhood disintegrative disorder. In some embodiments, Down Syndrome comprises Trisomy 21, Mosaicism, or Translocation. In some embodiments, Muscular Dystrophy comprises Duchenne muscular dystrophy, Becker muscular dystrophy, Congenital muscular dystrophy, Myotonic dystrophy, Facioscapulohumeral muscular dystrophy, Oculopharyngeal muscular dystrophy, Distal muscular dystrophy, or Emery-Dreifuss muscular dystrophy.

Non-limiting examples of conditions classified as neurological impairments comprise Amyotrophic Lateral Sclerosis, Arteriovenous Malformation, brain aneurysm, brain tumors, Dural Arteriovenous Fistulae, Epilepsy, headache, memory disorders, Multiple Sclerosis, Parkinson's Disease, Peripheral Neuropathy, Post-Herpetic Neuralgia, spinal cord tumor, stroke, Alzheimer's Disease, Corticobasal Degeneration, Creutzfeldt-Jakob Disease, Frontotemporal Dementia, Lewy Body Dementia, Mild Cognitive Impairment, Progressive Supranuclear Palsy, or Vascular Dementia.

In some embodiments, the methods described herein are used in conjunction with known techniques of diagnosing behavioral disorders, developmental delays, or neurological impairments. In some embodiments, the methods described herein enhance the accuracy of known methods of diagnosis, or reduce the time or recourses required for accurate diagnosis.

Machine Learning Software Modules

As described above, in some embodiments of the methods, devices, systems, software, and platforms described herein, a machine learning software module is utilized to identify questions and responses related to particular condition present in an individual being evaluated. In some embodiments, the machine learning algorithm utilizes input data and model input data to determine questions that are most likely to reduce the uncertainty of a diagnosis. A machine learning software module in some embodiments comprises a machine learning model (or data model). It should be understood that machine learning encompasses numerous architectures and arrangements of data and that the teachings herein are not limited to any one single type of machine learning.

A machine learning software module described herein is generally trained using questionnaire datasets from individuals with a known positive or negative diagnosis of one or more behavioral disorders, developmental delays, or neurological impairments.

In some embodiments, a trained machine learning software module analyzes input data that has not been previously associated with a particular behavioral disorder, developmental delay, or neurological impairment. In some embodiments, the machine learning algorithm generates recommended predictive input data, which is then acquired by asking the recommended question to the individual through the use of a digital questionnaire. The user (e.g. clinician, caretaker, subject) provides the additional input data as a response to the question, and the machine learning algorithm analyzes the additional input data collected and provides a probability diagnosis that one or more behavioral disorders, developmental delays, or neurological impairments is present in an individual. The machine learning algorithm generates recommended predictive input data and acquires additional input data through the user's responses until the uncertainty estimated benefit of acquiring additional input data is less than the cost of acquiring additional input data.

In some embodiments, the machine learning software module is a supervised learning algorithm. In some embodiments, the machine learning software module is selected from nearest neighbor, naive Bayes, decision tree, linear regression, support vector machine, or neural network.

In some embodiments, the machine learning software module provides a probability diagnosis without taking into account contextual indicators. In some embodiments, the machine learning software module provides a probability diagnosis through the analysis of questionnaire data solely. In some embodiments, the machine learning software module provides a probability diagnosis through the analysis of contextual indicators provide by the clinician, caretaker, or subject. For example, a user provides questionnaire data and contextual data (e.g. 5 year old, male child) of an individual responding to questions designed to evaluate for autism. In one embodiment, the machine learning software module analyzes the questionnaire data and includes data input by the user related to contextual indicators such as the child's age, sex and suspected diagnosis. In another embodiment, the machine learning software module analyzes the questionnaire data without the contextual indicators exemplified above.

Systems and Devices

Figure 7:
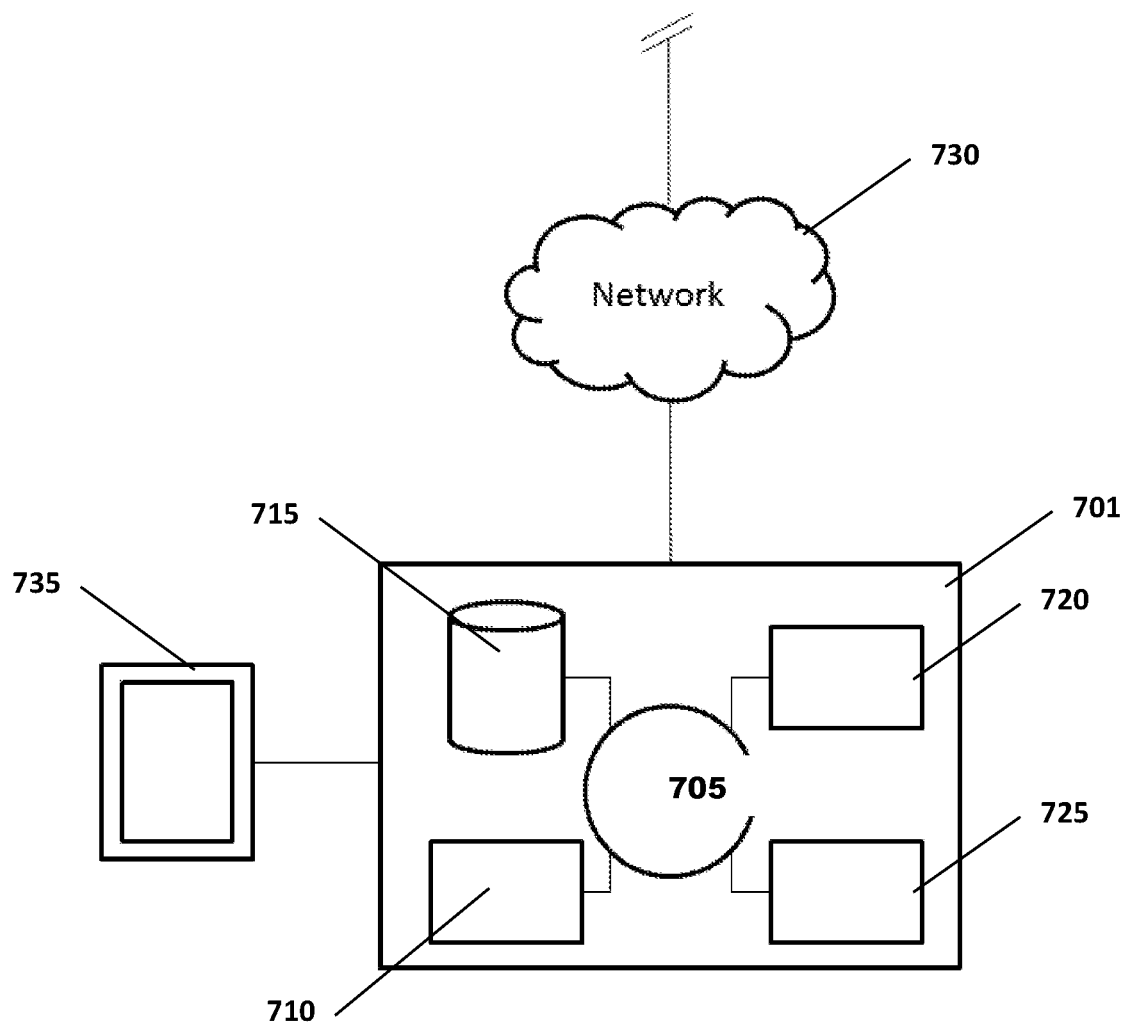
FIG. 7 shows a computer device suitable for use with the software described herein.

The present disclosure provides computer control devices that are programmed to implement methods of the disclosure. FIG. 7 shows a computer device 701 suitable for use with the software described herein. The computer device 701 can process various aspects of information of the present disclosure, such as, for example, questions and answers, responses, statistical analyses. The computer device 701 can be an electronic device of a user or a computer device that is remotely located with respect to the electronic device. The electronic device can be a mobile electronic device.

The computer device 701 includes a central processing unit (CPU, also "processor" and "computer processor" herein) 705, which can be a single core or multi core processor, or a plurality of processors for parallel processing. The computer device 701 also includes memory or memory location 710 (e.g., random-access memory, read-only memory, flash memory), electronic storage unit 715 (e.g., hard disk), communication interface 720 (e.g., network adapter) for communicating with one or more other devices, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer device 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer device 701, can implement a peer-to-peer network, which may enable devices coupled to the computer device 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the device 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer device 701 in some cases can include one or more additional data storage units that are external to the computer device 701, such as located on a remote server that is in communication with the computer device 701 through an intranet or the Internet.

The computer device 701 can communicate with one or more remote computer devices through the network 730. For instance, the computer device 701 can communicate with a remote computer device of a user (e.g., a parent). Examples of remote computer devices and mobile communication devices include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer device 701 with the network 730.

Methods as described herein can be implemented by way of machine (e.g., computer processor) executable code stored on an electronic storage location of the computer device 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the devices and methods provided herein, such as the computer device 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer device. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer device 701 can include or be in communication with an electronic display 735 that comprises a user interface (UI) for providing, for example, questions and answers, analysis results, recommendations. Examples of UI's include, without limitation, a graphical user interface (GUI) and web-based user interface.

Methods and devices of the present disclosure can be implemented by way of one or more algorithms and with instructions provided with one or more processors as disclosed herein. An algorithm can be implemented by way of software upon execution by the central processing unit 705. The algorithm can be, for example, random forest, graphical models, support vector machine or other.

Although the above steps show a method of a device in accordance with an example, a person of ordinary skill in the art will recognize many variations based on the teaching described herein. The steps may be completed in a different order. Steps may be added or deleted. Some of the steps may comprise sub-steps. Many of the steps may be repeated as often as if beneficial to the platform.

Each of the examples as described herein can be combined with one or more other examples. Further, one or more components of one or more examples can be combined with other examples.

Combination with Drug Therapy

In some embodiments, following evaluation of an individual using the software described herein, one or more drugs therapies are provided to the individual based on the classification of the individual generated by the software.

A classification may comprise autism or autism spectrum disorder, and the drug may be selected from the group consisting of risperidone, quetiapine, amphetamine, dextroamphetamine, methylphenidate, methamphetamine, dextroamphetamine, dexmethylphenidate, guanfacine, atomoxetine, lisdexamfetamine, clonidine, aripiprazolecomprise, vasopressin, and oxytocin.

The classification may comprise attention deficit disorder (ADD), and the drug may be selected from the group consisting of amphetamine, dextroamphetamine, methylphenidate, methamphetamine, dextroamphetamine, dexmethylphenidate, guanfacine, atomoxetine, lisdexamfetamine, clonidine, and modafinil.

The classification may comprise obsessive-compulsive disorder, and the drug may be selected from the group consisting of buspirone, sertraline, escitalopram, citalopram, fluoxetine, paroxetine, venlafaxine, clomipramine, and fluvoxamine.

The classification may comprise acute stress disorder, and the drug may be selected from the group consisting of propranolol, citalopram, escitalopram, sertraline, paroxetine, fluoextine, venlafaxine, mirtazapine, nefazodone, carbamazepine, divalproex, lamotrigine, topiramate, prazosin, phenelzine, imipramine, diazepam, clonazepam, lorazepam, and alprazolam; or the behavioral disorder, developmental delay, or neurological impairment may comprise adjustment disorder, and the drug may be selected from the group consisting of busiprone, escitalopram, sertraline, paroxetine, fluoextine, diazepam, clonazepam, lorazepam, and alprazolam.

The classification may comprise agoraphobia, and the drug may be selected from the group consisting of diazepam, clonazepam, lorazepam, alprazolam, citalopram, escitalopram, sertraline, paroxetine, fluoextine, and buspirone.

The classification may comprise Alzheimer's disease, and the drug may be selected from the group consisting of donepezil, galantamine, memantine, and rivastigmine; or the behavioral disorder, developmental delay, or neurological impairment may comprise anorexia nervosa, and the drug may be selected from the group consisting of olanzapine, citalopram, escitalopram, sertraline, paroxetine, and fluoxetine.

The classification may comprise anxiety disorders, and the drug may be selected from the group consisting of sertraline, escitalopram, citalopram, fluoxetine, diazepam, buspirone, venlafaxine, duloxetine, imipramine, desipramine, clomipramine, lorazepam, clonazepam, and pregabalin; or the behavioral disorder, developmental delay, or neurological impairment may comprise bereavement, and the drug may be selected from the group consisting of citalopram, duloxetine, and doxepin.

The classification may comprise binge eating disorder, and the drug may be selected from the group consisting of lisdexamfetamine.

The classification may comprise bipolar disorder, and the drug may be selected from the group consisting of topiramate, lamotrigine, oxcarbazepine, haloperidol, risperidone, quetiapine, olanzapine, aripiprazole, and fluoxetine.

The classification may comprise body dysmorphic disorder, and the drug may be selected from the group consisting of sertraline, escitalopram, and citalopram.

The classification may comprise brief psychotic disorder, and the drug may be selected from the group consisting of clozapine, asenapine, olanzapine, and quetiapine.

The classification may comprise bulimia nervosa, and the drug may be selected from the group consisting of sertraline and fluoxetine.

The classification may comprise conduct disorder, and the drug may be selected from the group consisting of lorazepam, diazepam, and clobazam.

The classification may comprise delusional disorder, and the drug may be selected from the group consisting of clozapine, asenapine, risperidone, venlafaxine, bupropion, and buspirone.

The classification may comprise depersonalization disorder, and the drug may be selected from the group consisting of sertraline, fluoxetine, alprazolam, diazepam, and citalopram.

The classification may comprise depression, and the drug may be selected from the group consisting of sertraline, fluoxetine, citalopram, bupropion, escitalopram, venlafaxine, aripiprazole, buspirone, vortioxetine, and vilazodone.

The classification may comprise disruptive mood dysregulation disorder, and the drug may be selected from the group consisting of quetiapine, clozapine, asenapine, and pimavanserin.

The classification may comprise dissociative amnesia, and the drug may be selected from the group consisting of alprazolam, diazepam, lorazepam, and chlordiazepoxide.

The classification may comprise dissociative disorder, and the drug may be selected from the group consisting of bupropion, vortioxetine, and vilazodone.

The classification may comprise dissociative fugue, and the drug may be selected from the group consisting of amobarbital, aprobarbital, butabarbital, and methohexitlal.

The classification may be selected from the group consisting of bupropion, venlafaxine, sertraline, and citalopram.

The classification may comprise eating disorders, and the drug may be selected from the group consisting of olanzapine, citalopram, escitalopram, sertraline, paroxetine, and fluoxetine.

The classification may be selected from the group consisting of estrogen, prostogen, and testosterone.

The classification may comprise generalized anxiety disorder, and the drug may be selected from the group consisting of venlafaxine, duloxetine, buspirone, sertraline, and fluoxetine.

The classification may comprise hoarding disorder, and the drug may be selected from the group consisting of buspirone, sertraline, escitalopram, citalopram, fluoxetine, paroxetine, venlafaxine, and clomipramine.

The classification may comprise intermittent explosive disorder, and the drug may be selected from the group consisting of asenapine, clozapine, olanzapine, and pimavanserin.

The classification may comprise kleptomania, and the drug may be selected from the group consisting of escitalopram, fluvoxamine, fluoxetine, and paroxetine.

The classification may comprise panic disorder, and the drug may be selected from the group consisting of bupropion, vilazodone, and vortioxetine.

The classification may comprise Parkinson's disease, and the drug may be selected from the group consisting of rivastigmine, selegiline, rasagiline, bromocriptine, amantadine, cabergoline, and benztropine.

The classification may comprise pathological gambling, and the drug may be selected from the group consisting of bupropion, vilazodone, and vartioxetine.

The classification may comprise postpartum depression, and the drug may be selected from the group consisting of sertraline, fluoxetine, citalopram, bupropion, escitalopram, venlafaxine, aripiprazole, buspirone, vortioxetine, and vilazodone.

The classification may comprise posttraumatic stress disorder, and the drug may be selected from the group consisting of sertraline, fluoxetine, and paroxetine.

The classification may comprise premenstrual dysphoric disorder, and the drug may be selected from the group consisting of estadiol, drospirenone, sertraline, citalopram, fluoxetine, and buspirone.

The classification may comprise pseudobulbar affect, and the drug may be selected from the group consisting of dextromethorphan hydrobromide, and quinidine sulfate.

The classification may comprise pyromania, and the drug may be selected from the group consisting of clozapine, asenapine, olanzapine, paliperidone, and quetiapine.

The classification may comprise schizoaffective disorder, and the drug may be selected from the group consisting of sertraline, carbamazepine, oxcarbazepine, valproate, haloperidol, olanzapine, and loxapine.

The classification may comprise schizophrenia, and the drug may be selected from the group consisting of chlopromazine, haloperidol, fluphenazine, risperidone, quetiapine, ziprasidone, olanzapine, perphenazine, aripiprazole, and prochlorperazine.

The classification may comprise schizophreniform disorder, and the drug may be selected from the group consisting of paliperidone, clozapine, and risperidone.

The classification may comprise seasonal affective disorder, and the drug may be selected from the group consisting of sertraline, and fluoxetine.

The classification may comprise shared psychotic disorder, and the drug may be selected from the group consisting of clozapine, pimavanserin, risperidone, and lurasidone.

The classification may comprise social anxiety phobia, and the drug may be selected from the group consisting of amitriptyline, bupropion, citalopram, fluoxetine, sertraline, and venlafaxine.

The classification may comprise specific phobia, and the drug may be selected from the group consisting of diazepam, estazolam, quazepam, and alprazolam.

The classification may comprise stereotypic movement disorder, and the drug may be selected from the group consisting of risperidone, and clozapine.

The classification may comprise Tourette's disorder, and the drug may be selected from the group consisting of haloperidol, fluphenazine, risperidone, ziprasidone, pimozide, perphenazine, and aripiprazole.

The classification may comprise transient tic disorder, and the drug may be selected from the group consisting of guanfacine, clonidine, pimozide, risperidone, citalopram, escitalopram, sertraline, paroxetine, and fluoxetine.

The classification may comprise trichotillomania, and the drug may be selected from the group consisting of sertraline, fluoxetine, paroxetine, desipramine, and clomipramine.

Combination with Drug Therapy

In some embodiments, following evaluation of an individual using the software described herein, one or more digital therapies are provided to the individual based on the classification of the individual generated by the software. A digital therapy can comprise a single or multiplicity of therapeutic activities or interventions that can be performed by the patient or caregiver. The digital therapeutic can include prescribed interactions with third party devices such as sensors, computers, medical devices and therapeutic delivery systems. Digital therapies can support an FDA approved medical claim, a set of diagnostic codes, or a single diagnostic code. The digital therapy can comprises instructions, feedback, activities or interactions provided to the subject or caregiver. In some embodiments, the digital therapy comprises a personal therapeutic treatment plan. The personal therapeutic treatment plan can include schedule for the frequency, amount/quantity, or duration of the digital therapy. As an illustrative example, a personal therapeutic treatment plan for a digital therapy may specify undergoing a digital therapy (e.g., implemented via a software module providing speech/language activities) once per day (frequency) for at least a minimum duration such as 20 minutes (quantity or amount) for a sustained period of time such as 3 months (duration).

The systems, software, and methods disclosed herein can include a software module configured to generate the personal therapeutic treatment plan. The software module can be configured to determine an optimal frequency, amount, and/or duration for the personal therapeutic treatment plan or the digital therapy. The treatment plan can be generated at least in part using machine learning models or classifiers trained on training data to predict efficacy of therapeutic outcome. Multiple possible treatment plans may be evaluated to determine optimal treatment plans for specific individuals based on relevant features (e.g., diagnostic features used to make the identification or diagnosis of one or more disorders such as autism/ASD).

The systems and methods described herein can provide digital diagnostics and digital therapeutics to patients. The digital personalized medicine system can use digital data to assess or diagnose symptoms of a patient in ways that inform personalized or more appropriate therapeutic interventions and improved diagnoses.

In one aspect, the digital personalized medicine system can comprise digital devices with processors and associated software that can be configured to: capture interaction and feedback data that identify relative levels of efficacy, compliance and response resulting from the therapeutic interventions; and perform data analysis. Such data analysis can include artificial intelligence, including for example machine learning, and/or statistical models to assess user data and user profiles to further personalize, improve or assess efficacy of the therapeutic interventions.

In some instances, the system can be configured to use digital diagnostics and digital therapeutics. Digital diagnostics and digital therapeutics can comprise a system or methods for digitally collecting information and processing and evaluating the provided data to improve the medical, psychological, or physiological state of an individual. A digital therapeutic system can apply software based learning to evaluate user data, monitor and improve the diagnoses and therapeutic interventions provided by the system.

In addition, the systems and methods described herein can provide digital diagnostics and digital therapeutics to patients. The digital personalized medicine system can use digital data to assess or diagnose symptoms of a patient in ways that inform personalized or more appropriate therapeutic interventions and improved diagnoses.

In one aspect, the digital personalized medicine system can comprise digital devices with processors and associated software that can be configured to: use data to assess and diagnose a patient; capture interaction and feedback data that identify relative levels of efficacy, compliance and response resulting from the therapeutic interventions; and perform data analysis. Such data analysis can include artificial intelligence, including for example machine learning, and/or statistical models to assess user data and user profiles to further personalize, improve or assess efficacy of the therapeutic interventions.

In some instances, the system can be configured to use digital diagnostics and digital therapeutics. Digital diagnostics and digital therapeutics can comprise a system or methods for digitally collecting information and processing and evaluating the provided data to improve the medical, psychological, or physiological state of an individual. A digital therapeutic system can apply software based learning to evaluate user data, monitor and improve the diagnoses and therapeutic interventions provided by the system.

In addition, the digital personalized medicine systems and methods described herein can provide digital diagnostics and digital therapeutics to patients. The digital personalized medicine system can use digital data to assess or diagnose symptoms of a patient in ways that inform personalized or more appropriate therapeutic interventions and improved diagnoses.

In one aspect, the digital personalized medicine system can comprise digital devices with processors and associated software that can be configured to: use data to assess and diagnose a patient; capture interaction and feedback data that identify relative levels of efficacy, compliance and response resulting from the therapeutic interventions; and perform data analysis. Such data analysis can include artificial intelligence, including for example machine learning, and/or statistical models to assess user data and user profiles to further personalize, improve or assess efficacy of the therapeutic interventions.

In some instances, the system can be configured to use digital diagnostics and digital therapeutics. Digital diagnostics and digital therapeutics can comprise a system or methods for digitally collecting information and processing and evaluating the provided data to improve the medical, psychological, or physiological state of an individual. A digital therapeutic system can apply software based learning to evaluate user data, monitor and improve the diagnoses and therapeutic interventions provided by the system.

Devices and Systems for Evaluating Behavioral Disorders, Developmental Delays, and Neurological Impairments In some embodiments, evaluation of individuals using the software described herein utilizes a mobile device or stationary computing device. In some embodiments, the mobile device is a smartphone, a tablet, or a laptop computer. In some embodiments, a mobile application on the mobile device or stationary device is used to display questions used for evaluation, and provide an interface for responding to the questions being displayed.

In some embodiments, systems and devices disclosed herein comprise a recording device. In some embodiments, video and/or audio recording are taken with a mobile device. In some embodiments, the mobile device is a smartphone, a tablet, a smartwatch, or any device with a mobile camera or recording feature. In some embodiments, the video and/or audio recording is taken with a stationary camera and/or microphone.

Digital Processing Device

In some embodiments, software as described herein is located on a digital processing device, and/or is configured to cause the processor of the digital processing device to carry out certain tasks. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, a computing device used with the software described herein further includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, software as described herein comprises a sequence of instructions, executable by a processor such as a digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, software as described herein comprises a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, software described herein comprises a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, software described herein comprises a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the software described herein comprises or works in conjunction with a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, software described herein comprises modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, software described herein operates in conjunction with one or more databases, or use of the same. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Platforms for Evaluating Behavioral Disorders, Developmental Delays, and Neurological Impairments In some embodiments, software described herein is configured to use in one or more platforms for evaluating behavioral disorders, developmental delays, and neurological impairments comprising one or more computing devices each with an application that allows communication and/or sharing of data between the one or more computing devices. In some embodiments, an application provides a user a specialized portal such as, for example, a healthcare provider portal and a patient portal. Features provided by the applications on the platform described herein include recording an individual and evaluating the individual using the techniques described herein.

In some embodiments, a user provides input data of an individual to be evaluated through the use of a questionnaire on a first user application on a first computing device. In some embodiments, the user application provides questions one at a time, and actively generates questions according to the methods described above.

In some embodiments, the input data is analyzed by a machine learning software module that provides probability diagnosis scores for each possible diagnosis and classification values related to classification categories for each indication. In some embodiments, the analysis is provided to a clinician through the use of a clinician application. In some embodiments, a probability diagnosis score must rise above a numerical threshold to be displayed in the clinician application. In some embodiments, probability diagnosis scores that fall below a specified threshold are displayed in a separate tab or screen in the clinician application. In some embodiments, the clinician reviews the results of the analysis and requests additional data through the clinicians application. For example, a clinician may receive results that a child has a probability diagnosis score of 35% for a type of autism, a probability diagnosis score of 48% for a type of mental retardation, and a probability diagnosis score of 10% for a speech disorder. The probability score threshold is set to 25%, and the clinician reviews the scores for autism and mental retardation. The clinician orders behavioral tests through the application, and request an additional video of the child performing tasks that are indicative of one or both indications. In some embodiments, the clinician diagnoses the individual with the aid of the results provided by the machine learning algorithm. In some embodiments, the clinician inputs the diagnosis into the application and the data and diagnosis is available to a health care provider.

In some embodiments, the healthcare provider is able to coordinate the treatment of the individual and provide advice for treatment to the user and individual. In some embodiments, the individual's treating clinicians in the network of the healthcare provider are able to access an individual's input data.

What is claimed is:

1. A method for treating an individual for autism spectrum disorder, comprising:
    (a) receiving, via a user interface of a computing device, an input comprising text data, audio data, or video data associated with a diagnostic assessment for evaluating said individual for autism spectrum disorder;
    (b) generating, with a model, a plurality of likelihoods based at least on said input, each comprising a likelihood of said individual having one of a plurality of conditions, wherein said likelihood of said individual having said one of said plurality of conditions is generated based at least in part on a penalty score, wherein said penalty score is a measure of severity of incorrectly classifying said individual as having said one condition, and wherein said plurality of conditions comprises autism spectrum disorder and a second condition that is not autism spectrum disorder;
    (c) identifying a next input that will reduce an uncertainty in said model for distinguishing between a likelihood of said individual having said autism spectrum disorder and a likelihood of said individual having said second condition;
    (d) presenting, via said user interface, a prompt displayed on said computing device to provide interaction data of said individual, wherein said visual prompt elicits said individual to provide said interaction data based on said next input identified in (c);
    (e) receiving, via said user interface, at least said interaction data, wherein said interaction data comprises text data, audio data, or video data;
    (f) determining that said individual has autism spectrum disorder based at least in part on said interaction data;

(g) responsive to said determining in (f), providing a digital therapy comprising a speech or language activity to said individual to treat said autism spectrum disorder, wherein said digital therapy is selected based at least in part on a machine learning model trained to predict an efficacy of said digital therapy; and (h) receiving digital therapy interaction data comprising efficacy data of said digital therapy, wherein said digital therapy interaction data is used for training said machine learning model.

2. The method of claim 1, wherein said input is a response to a questionnaire.

3. The method of claim 2, wherein said questionnaire is a shortened version of a full-length questionnaire.

4. The method of claim 1, further comprising determining a classification of said individual as having said autism spectrum disorder or said second condition.

5. The method of claim 4, wherein said classification is based at least in part on a sub-set of items from said diagnostic assessment.

6. The method of claim 1, wherein said input comprises answers provided by a caretaker of said individual.

7. The method of claim 1, wherein said input comprises a video assessment, a video questionnaire, a written questionnaire, an audio recording of a questionnaire, or a non-video questionnaire.

8. The method of claim 1, wherein said second condition comprises a neurotypical condition or an inconclusive condition.

9. The method of claim 1, wherein said model is generated using Monte Carlo methods.

10. The method of claim 1, wherein said model is generated using a machine learning model.

11. The method of claim 10, wherein said machine learning model comprises a classifier.

12. The method of claim 1, wherein said model is generated using at least one question that has been asked to a plurality of individuals with a known positive or negative diagnosis of a behavioral disorder, developmental delay, or neurological impairment.

13. The method of claim 1, wherein said model is generated using the most common answer that has been received from a plurality of individuals with a known positive or negative diagnosis of a behavioral disorder, developmental delay, or neurological impairment.

14. The method of claim 4, further comprising determining whether to output said classification or perform additional analysis.

15. The method of claim 14, wherein said additional analysis is performed when an uncertainty of said classification is considered with respect to a cost of performing said additional analysis.

16. The method of claim 1, further comprising determining a penalty score for each of said conditions.

17. The method of claim 16, wherein a classification of said individual comprising said autism spectrum disorder or said second condition is outputted only when said penalty score is less than a penalty gate.

18. The method of claim 1, further comprising determining a classification of said individual comprising said autism spectrum disorder or said second condition, and treating said individual based on said classification by providing said individual with a drug therapy.

19. The method of claim 18, wherein said second condition comprises pervasive development disorder (PDD), social communication disorder, restricted repetitive behaviors, interests, and activities (RRBs), PDD-not otherwise specified (PDD-NOS), attention deficit disorder (ADD), attention deficit and hyperactivity disorder (ADHD), speech and language delay, obsessive compulsive disorder (OCD), anxiety disorder, depression, schizophrenia, Alzheimer's disease, dementia, intellectual disability, or learning disability.

* * * * *